(12) United States Patent
Collier-Hallman

(10) Patent No.: US 9,975,570 B2
(45) Date of Patent: May 22, 2018

(54) VELOCITY SIGNAL FILTER WITH REDUCED LAG

(71) Applicant: STEERING SOLUTIONS IP HOLDING CORPORATION, Saginaw, MI (US)

(72) Inventor: Steven J. Collier-Hallman, Frankenmuth, MI (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 8 days.

(21) Appl. No.: 14/186,611

(22) Filed: Feb. 21, 2014

(65) Prior Publication Data

US 2014/0244113 A1  Aug. 28, 2014

Related U.S. Application Data

(60) Provisional application No. 61/768,111, filed on Feb. 22, 2013.

(51) Int. Cl.
*B26D 5/04* (2006.01)
*G01P 3/00* (2006.01)
*B62D 5/04* (2006.01)
*G01P 3/44* (2006.01)
*G01P 3/64* (2006.01)

(52) U.S. Cl.
CPC .............. *B62D 5/046* (2013.01); *G01P 3/44* (2013.01); *G01P 3/64* (2013.01)

(58) Field of Classification Search
CPC .. H02P 7/06; H02P 7/00; G05B 19/31; G01M 1/02; A01B 69/00; B62D 5/04
See application file for complete search history.

(56) References Cited

U.S. PATENT DOCUMENTS

| | | | | |
|---|---|---|---|---|
| 5,760,562 A | * | 6/1998 | Woodland | G05B 19/33 318/632 |
| 6,242,874 B1 | * | 6/2001 | Kalpathi et al. | 318/400.32 |
| 6,293,366 B1 | * | 9/2001 | Chabaan | B62D 6/10 180/443 |
| 2006/0175998 A1 | * | 8/2006 | Katch et al. | 318/432 |
| 2006/0226802 A1 | * | 10/2006 | Marentette | B60S 1/08 318/443 |
| 2007/0175697 A1 | * | 8/2007 | Choi | 180/444 |
| 2008/0306655 A1 | * | 12/2008 | Ukai | B62D 5/046 701/42 |
| 2009/0000857 A1 | * | 1/2009 | Sugiyama | B62D 5/0472 180/444 |

* cited by examiner

*Primary Examiner* — Ryan Rink
*Assistant Examiner* — Paul A Castro
(74) *Attorney, Agent, or Firm* — Cantor Colburn LLP

(57) ABSTRACT

A method of calculating a motor velocity in an electric power steering system comprises receiving a plurality of motor position signals from a motor position sensor of the electronic power steering system, calculating a plurality of angle difference based on the motor position signals prior to performing any filtering operations on the motor position signals, performing a linear regression analysis on the angle differences to predict an angle difference, and calculating a motor velocity based on the predicted angle difference.

21 Claims, 3 Drawing Sheets

VELOCITY SIGNAL FILTER WITH REDUCED LAG

CROSS-REFERENCES TO RELATED APPLICATIONS

This patent application claims priority to U.S. Provisional Patent Application Ser. No. 61/768,111 filed Feb. 22, 2013 which is incorporated herein by reference in its entirety.

BACKGROUND OF THE INVENTION

Motor velocity is an important signal for electronic steering. It is used in the control of the motor as well as in steering related functions such as active damping and inertia compensation. In many systems, the motor velocity signal is obtained by differentiating the motor position signal or the signals used to derive motor position with respect to time. In this case, there is a tradeoff between lag, resolution and noise that can be obtained by setting the period of the differentiation or filtering the signal with a low pass filter. Increasing the differentiation period improves noise and resolution but degrades lag. Filtering with a low pass filter also improves noise and resolution at the expense of lag.

Noise and resolution of the motor velocity signal are important because they translate into audible noise and torque disturbances in the steering system. Lag is important because it directly affects the dynamic performance of the system. Excess lag is often perceived as "inertia" and is not desirable.

Many motor velocity measurement schemes exist today, including the following three schemes. The first is a discrete digital motor position sensor that is used to derive a velocity signal using a finite difference differentiation with respect to time. The second improves on the first by adding an analog tachometer for low motor speeds, blending with the differentiated position at higher motor speeds. The third method uses an analog position sensor that generates signals representing the sine and cosine of the motor shaft angle. The sine and cosine signals are filtered with a moving average oversampling filter to improve noise and resolution. The filtered sine and cosine signals are differentiated with respect to time using a finite difference differentiator. The differentiated sine and cosine signals are then processed using the angle difference identity for sine to get velocity.

These motor basic motor velocity measurement schemes have their advantages as well as limitations in their implementations. Accordingly, it is desirable to provide methods and systems that improve accuracy in measuring motor velocity.

SUMMARY OF THE INVENTION

In one embodiment of the invention, a method of controlling an electric power steering system comprises receiving a plurality of motor position signals from a motor position sensor of the electronic power steering system, calculating a plurality of angle difference based on the motor position signals prior to performing any filtering operations on the motor position signals, performing a linear regression analysis on the angle differences to predict an angle difference, and calculating a motor velocity based on the predicted angle difference.

In another embodiment of the invention, a control system for controlling an electric power steering system comprises an angle difference calculation module configured to receive a plurality of motor position signals from a motor position sensor of the electronic power steering system and calculate a plurality of angle difference based on the motor position signals prior to performing any filtering operations on the motor position signals, a regression module configured to perform a linear regression analysis on the angle differences to predict an angle difference, a motor velocity calculation module configured to calculate a motor velocity based on the predicted angle difference, and a control module configured to control the electric power steering system using the motor velocity.

In yet another embodiment of the invention, a system comprises a power steering system that includes a motor and a motor position sensor, and a control module configured to receive a plurality of motor position signals from the motor position sensor, calculate a plurality of angle difference based on the motor position signals prior to performing any filtering operations on the motor position signals, perform a linear regression analysis on the angle differences to predict an angle difference, calculate a motor velocity based on the predicted angle difference, and control the power steering system using the motor velocity.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
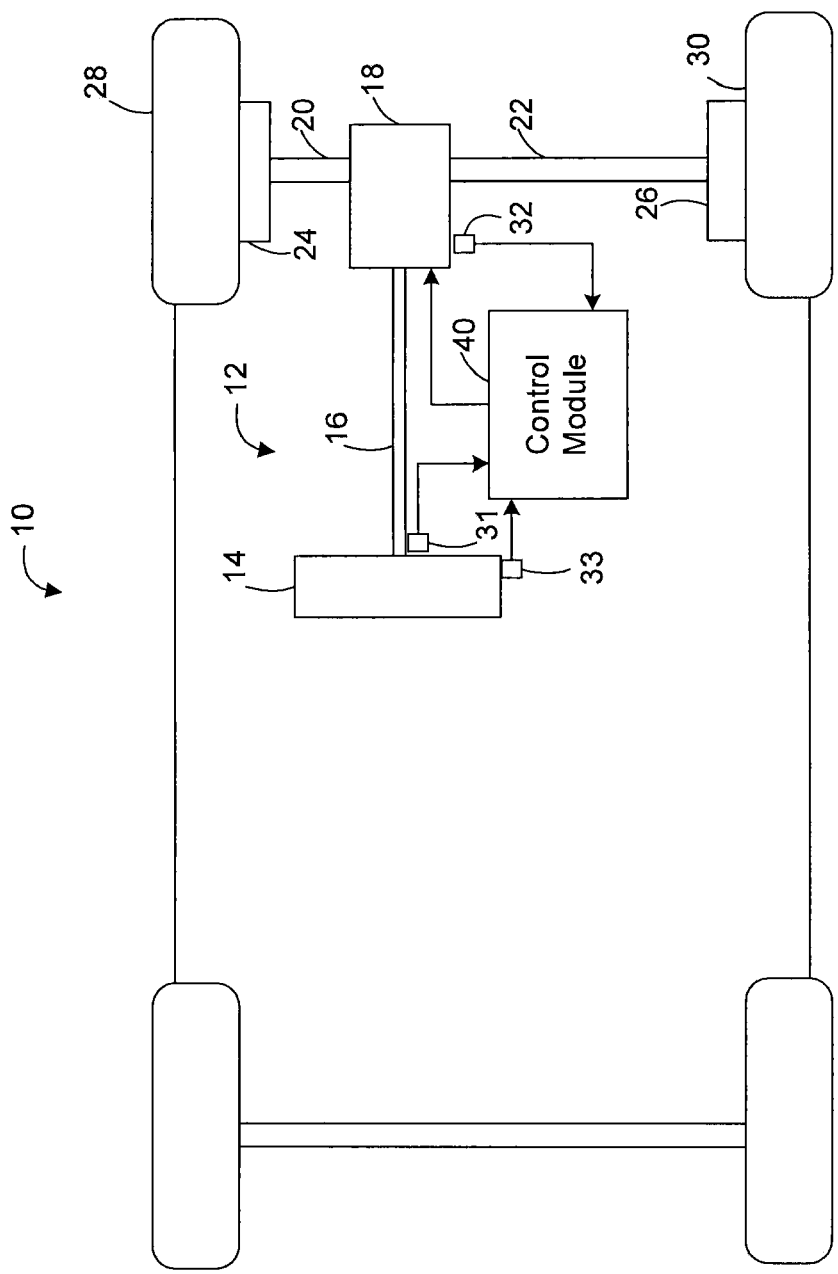
FIG. 1 is a functional block diagram of a steering system that includes a motor velocity calculation system in accordance with exemplary embodiments.

The following description is merely exemplary in nature and is not intended to limit the present disclosure, application, or uses. It should be understood that throughout the drawings, corresponding reference numerals indicate like or corresponding parts and features.

Referring now to FIG. 1, where the invention will be described with reference to specific embodiments without limiting same, an exemplary embodiment of a vehicle 10 including a steering system 12 is illustrated. In various embodiments, the steering system 12 includes a hand wheel 14 coupled to a steering shaft 16. In one exemplary embodiment, the steering system 12 is an electric power steering (EPS) system that further includes a steering assist unit 18 that couples to the steering shaft 16 of the steering system 12 and to tie rods 20, 22 of the vehicle 1. The steering assist unit 18 includes, for example, a rack and pinion steering mechanism (not shown) that may be coupled through the steering shaft 16 to a steering actuator motor and gearing (hereinafter referred to as the steering actuator). During operation, as the hand wheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 1. Although an EPS system is illustrated in FIG. 1 and described herein, it is appreciated that the steering system 12 of the present disclosure can include various controlled steering systems including, but not limited to, steering systems with hydraulic configurations, and steer by wire configurations.

As shown in FIG. 1, the vehicle 10 further includes various sensors 31-33 that detect and measure observable conditions of the steering system 12 and/or of the vehicle 1. The sensors 31-33 generate sensor signals based on the observable conditions. In various embodiments, the sensors 31-33 include, for example, a motor position sensor. In one embodiment, the motor position sensor is an analog position sensor that generates signals representing the sine and cosine of the motor shaft angle. The motor position sensor sends the signals to the controller 40.

In various embodiments, a control module 40 controls the operation of the steering system 12 and/or the vehicle 10 based on one or more of the sensor signals and further based on the motor velocity calculation system and method of the present disclosure. Generally speaking, the method in various embodiments of the invention defines a new filtering scheme for filtering motor position signals that allows more flexibility in tradeoffs between noise, resolution, and lag in calculating a motor velocity. The method also reduces noise with reduced lag and accounts for non-uniform sample rates.

Specifically, in one embodiment, the method performs an angle difference identity calculation (e.g., trigonometric identity calculation to compute an angle difference) before performing any filtering operations on motor position signals (e.g., sine and cosine signals of the motor position). Performing the angle difference calculation before performing the filtering operations results in better accuracy because, in some cases, filtering the sine and cosine signals prior to using the trigonometric identity calculation distorts the sine and cosine signals as the motor velocity increases. Performing trigonometric identity calculation first removes the inaccuracy resulting from filtering the signals first.

In one embodiment, the method uses a moving liner regression filter. The linear regression filter uses the angle difference resulting from the trigonometric identity calculations along with the time stamps of the sine and cosine signals to determine (1) the average angle difference that centered within a window that encompasses the samples of the signals and (2) the slope of the angle difference with respect to time. In various embodiments, the determined average and slope are then used to predict what the value of the angle difference would be at some time after the center of the sample window.

In one embodiment, the method uses an arcsine function to complete the trigonometric identity calculation. The method then divides the resulting angle difference by the time difference to obtain a velocity measurement. The prediction time is an input to an algorithm that allows a tradeoff between lag and noise. In one embodiment, a prediction value of zero essentially reduces the regression filter to a moving average filter. Increasing the prediction value reduces the lag in the algorithm at the expense of noise.

Figure 2:
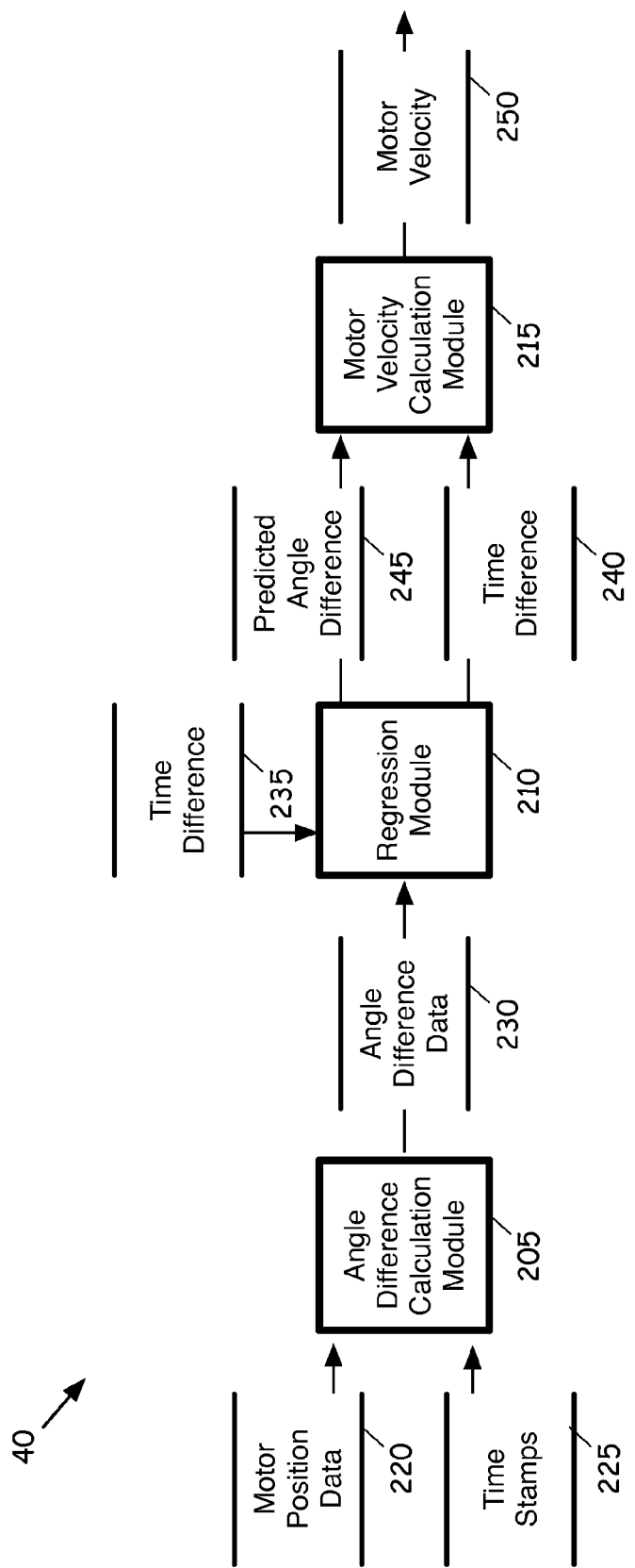
FIG. 2 is a dataflow diagram illustrating a motor velocity calculation system in accordance with exemplary embodiments.

Referring now to FIG. 2 where a dataflow diagram illustrates exemplary embodiments of the control module 40 of FIG. 1 used to control the steering system 12 and/or the vehicle 10 of FIG. 1. In various embodiments, the control module 40 can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in FIG. 2 can be combined and/or further partitioned to similarly reduce steering torque variation. As can be appreciated, the sub-modules shown in FIG. 2 can be implemented as a single control module 40 (as shown) or multiple control modules (not shown). Inputs to the control module 40 can be generated from the sensors of the vehicle 10 (FIG. 1), can be modeled within the control module 40 (e.g., by other sub-modules (not shown)), can be received from other control modules (not shown), and/or can be predefined. In various embodiments, the control module 40 includes an angle difference calculation module 205, a regression module 210, and a motor velocity calculation module 215.

In one embodiment, the angle difference calculation module 205 receives as input a set of motor position signals 220 from a motor position sensor, which is one of the sensors 31-33. Based on the motor position signals, the angle difference calculation module 205 generates an angle difference signal 230 and sends it to the regression module 210.

The motor position signals 220 in one embodiment includes two sets of signals. The first set of signals represents different positions of the shaft of the motor of the steering assist unit 18 with respect to a reference position at different instances in time. The second set of signals also represents different positions of the shaft of the motor with respect to the reference position at different instances in time. However, the first set of signals span over a first period of time that is different than a second period of time over which the second set of signals span. In one embodiment, the first period of time is temporally ahead of the second period of time, and the lengths of the first and the second periods are identical.

In one embodiment, each the two sets of signals are received in the form of an array of data sampled at 2 milliseconds. Specifically, the items in the array of each of the two sets of the signals represent N (a positive integer) samples, which result from resampling 62-microsecond samples at 2 milliseconds. Each item in the array includes a sample indicating a position of the motor shaft. The item also includes a time stamp at which the sample was taken from the signals. Therefore, there are N items in each array of sampled data. Moreover, in one embodiment, each item in the first array of sampled data has a corresponding item in the second array.

In one embodiment, the angle difference calculation module 205 uses one item in one of the arrays and the corresponding item in the other array to calculate an angle difference between two positions of the shaft. The angle difference calculation module 205 repeats this angle difference calculation for all items of the arrays. In this manner, the angle difference calculation module 205 generates an array of angle differences 230 based on the two arrays of sampled data. In one embodiment, the motor position sensor samples the signals using a barrel register (shifter) and the two sets of signals do not have be in time-increasing order.

Angle difference calculations performed by the angle difference calculation module 205 will now be described in more details. In one embodiment, each of the two sets of signals includes a pair of sine and cosine signals that represents different positions of the shaft at different instances in time. Assume, as an example, that the first pair of sine and cosine signals of the first set of signals represents an angle α and the second pair of the sine and cosine signals of the second signals represents an angle $\beta$, which is greater than the angle $\alpha$. The $\alpha$ and $\beta$ are variables that change as the shaft of the motor rotates. That is, the first pair of sine and cosine signals are expressed in terms of sin $\alpha$ and cos $\alpha$, and the second pair of sine and cosine signals are expressed in terms of sin $\beta$ and cos $\beta$. Therefore, each item in the data array for the first set of the signals includes values of sin $\alpha$ and cos $\alpha$ at different instances in time, while each item in the data array for the second set of signals includes values of sin $\beta$ and cos $\beta$ at different instances in time.

For each corresponding pair of items in the two arrays, the angle difference calculation module 205 calculates a sine value of the difference between $\alpha$ and $\beta$ (i.e., sin($\beta-\alpha$)) by using a cross-product of the sine and cosine signals of the two sets of signals. Specifically, the angle difference calculation module 205 uses the following equation:

$$\sin(\beta - \alpha) \cong \frac{(A\sin\beta \times A\cos\alpha) - (A\cos\beta \times A\sin\alpha)}{A^2 si^2\beta + A^2\cos^2\beta} = \quad (1)$$

$$(\sin\beta \times \cos\alpha) - (\cos\beta \times \sin\alpha)$$

where A represents the amplitudes of sin $\alpha$, cos $\alpha$, sin $\beta$, and cos $\beta$. In one embodiment, A is derived from known parameter values (e.g., a reference voltage value) of the motor position sensor. The amplitudes of sin $\alpha$ and sin $\beta$ are the same and the amplitudes of cos $\alpha$ and cos $\beta$ are the same because $\alpha$ and $\beta$ represent angles of the same wave at two different instances in time. The amplitudes of sin $\alpha$ (or of sin $\beta$) and cos $\alpha$ (or cos $\beta$) are generally different but are made to be the same in one embodiment before the amplitudes are plugged into the equation (1). In this manner, the angle difference calculation module 205 generates an array of sine values of the differences between $\alpha$ and $\beta$. In one embodiment, each item in this array is associated with a time difference between the two time instances of the two angle values for the item.

The angle difference calculation module 205 sends the array of sine values representing the angle differences to the regression module 21. The regression module 210 performs a linear regression analysis on this array to predict a sine value of an angle difference—e.g., sin($\beta'-\alpha'$), where $\beta'$ and $\alpha'$ represent predicted positions of the motor shaft. For instance, the regression module 210 fits a line through N values of sin($\beta-\alpha$) to approximate a linear relationship between the time and the sin($\beta-\alpha$). The regression module 210 also determines the slope of the line with respect to time. Using the line and the slope determined, the regression module 210 predicts a sine value of an angle difference at some time after the sampled period. Specifically, in one embodiment, the regression module 210 uses the following equations:

$$\text{Slope} = \frac{N\sum_{i=1}^{N}(x_i \times y_i) - \sum_{i=1}^{N}x_j \times \sum_{i=1}^{N}y_i}{N\sum_{i=1}^{N}x_i^2 - \sum_{i=1}^{N}x_i} \quad (2)$$

$$y_{new} = Slope \times x_{offset} + \frac{\sum_{i=1}^{N}x_i}{N} \quad (3)$$

where x represents a sum of time values for two corresponding position values in the two arrays; y represents sine values of the angle differences, sin($\beta-\alpha$); N is the number of samples in the arrays as mentioned above; $x_{offset}$ represents the time offset 235; and $y_{new}$ represents the sine value of the predicted angle difference, sin($\beta'-\alpha'$). In one embodiment, the regression module 210 uses the time offset 235 to adjust timing between the time stamps of two corresponding position values of the two arrays such that there is no rollover between the time stamps of the two arrays.

In one embodiment, the regression module 210 uses the following equations as an alternative to the equation (3) to predict an angle difference.

$$\text{Intercept} = \frac{\sum_{i=1}^{N}y_i}{N} + Slope \times \frac{\sum_{i=1}^{N}x_i}{N} \quad (4)$$

$$y_{new} = Intercept + Slope \times x_{new} \quad (5)$$

where $x_{new}$ represents the time value of the time for which $y_{new}$ is predicted. In one embodiment, $x_{new}$ is an input to the above-mentioned algorithm that allows a tradeoff between lag, and noise. $y_{new}$ of zero reduces the linear regression analysis to a moving average analysis. Also, increasing $x_{new}$ value reduces the lag in the algorithm at the expense of noise.

The regression module 210 sends the computed sine value of the predicted angle difference 245 as well as the time difference 240 between two positions separated by the predicted angle difference to the motor velocity calculation module 215. The motor velocity calculation module 215 calculates the velocity of the motor 250 based on the predicted angle difference and the time difference. In one embodiment, the motor velocity calculation module 215 utilizes an arcsine function to covert the sine value of the angle difference to an angle value. The motor velocity calculation module 215 divides the converted angle value by the time difference 240 to get a motor velocity value—i.e., an angular velocity value in radian per second or degree per second.

Figure 3:
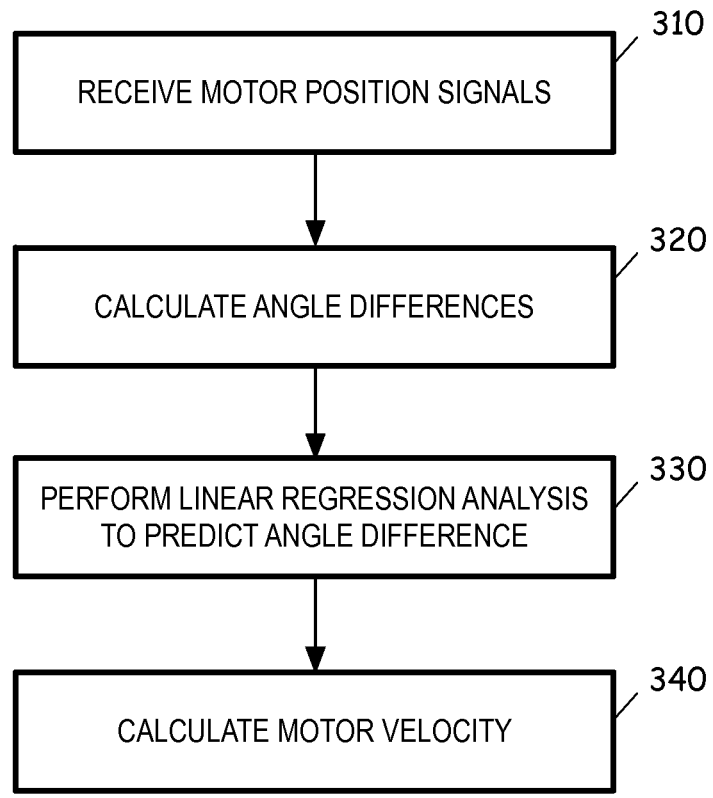
FIG. 3 is flow diagram illustrating a motor velocity calculation method in accordance with exemplary embodiments.

Referring now to FIG. 3, a flow diagram illustrates a motor velocity calculation method that can be performed by the control module 40 of FIG. 1. As can be appreciated in light of the disclosure, the order of operation within the method is not limited to the sequential execution as illustrated in FIG. 3, but may be performed in one or more varying orders as applicable and in accordance with the present disclosure.

In one example, the method at 310 receives a set of motor position signals from a motor vehicle sensor (one of the sensors 31-33) that generates the signals. In one embodiment, the motor vehicle sensor is a resolver that produces sine and cosine signals for indicating the angle by which the shaft rotates with respect to a reference position. In one embodiment, the motor vehicle sensor samples the motor position signals at a certain frequency (e.g., at 62 microseconds) and then resample the sampled data at another frequency (e.g., 2 milliseconds). In one embodiment, the control module 40 rather than the motor vehicle sensor performs the resampling of the data.

In one embodiment, the motor vehicle sensor sends the signals to the control module 40 in the form of data arrays in which each item represents sampled data at a particular instance in time. The motor vehicle sensor sends two arrays each of which represents data sampled over a period of time. The period of time covered by the data samples of the first array is temporally ahead of the period of time covered by the data samples of the second array. In one embodiment, each data array is pushed out to the control 40 by a barrel shifter of the motor vehicle sensor and contains N items.

In one embodiment, each item in the arrays has a time stamp that indicates an instance in time at which the data in the item is sampled. Also, each item in the arrays includes a pair of sine and cosine values of an angle at which the shaft of the motor was at the time instance indicated by the time stamp of the array item. One of ordinary skill in the art will recognize that the signals sent by the vehicle sensor do not have to be in the form of arrays or in the particular array formats described so far.

At 320, the method calculates angle differences based on the received motor position signals. In one embodiment, the method performs the calculation before performing any filtering operations on the received motor position signals. More specifically, the method in one embodiment calculates sine values of angle difference between each item of the first array and a corresponding item in the second array by using the equation (1) described above.

At 330, the method performs a linear regression analysis on the angle differences calculated at 320 in order to predict an angle difference value. For instance, the method fits a straight line through N $\sin(\beta-\alpha)$ values and determines the slope of the straight line. The method then predicts a sine value of an angle difference by using the equations (2) and (3), or the equations (2), (4) and (5).

At 340, the method calculates a motor velocity value based on the angle difference value predicted at 330 and the time difference for the two angle values predicted at 33. In one embodiment, the method utilizes an arcsine function to covert the sine value of the angle difference to an angle value. The method divides the converted angle value by the time difference to get a motor velocity value.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A method of calculating a motor velocity in an electric power steering system, the method comprising:
    receiving, with a processor, a first set of plurality of motor position signals from a motor position sensor of the electric power steering system, each of the motor position signal from the first set indicating a position of a motor of the electric power steering system at a respective instance of time from a first duration;
    receiving, with the processor, a second set of plurality of motor position signals from the motor position sensor, each of the motor position signal from the second set indicating a position of the motor at a respective instance of time from a second duration;
    calculating, with the processor, a plurality of angle differences based on the first set of motor position signals and the second set of motor position signals, by calculating a difference between corresponding values from the first set of motor position signals and the second set of motor position signals;
    filtering the motor position signals by performing, with the processor, a linear regression analysis on the plurality of angle differences to determine a predicted angle difference, the filtering performed after calculating the plurality of angle differences between the first set of motor position signals and the second set of motor position signals;
    calculating, with the processor, a motor velocity based on the predicted angle difference; and
    controlling, with the processor, the electric power steering system based on the calculated motor velocity.

2. The method of claim 1, wherein each of the motor position signals comprises a first motor position signal and a second motor position signal, and each of the first and second motor position signals comprises a sine signal and a cosine signal.

3. The method of claim 2, wherein the calculating the angle differences comprises using one or more trigonometric identities for the sine and cosine signals.

4. The method of claim 2, wherein the calculating the angle differences comprises cross-multiplying the sine and cosine signals of the first and second motor signals.

5. The method of claim 2, wherein the first duration is temporally ahead of the second duration.

6. The method of claim 5, wherein the performing the linear regression comprises analyzing the first set of motor positions and the second set of motor positions, and the first and second durations cover a same length of time, but not a same period of time.

7. The method of claim 1, wherein the predicted angle difference is a sine value, wherein the calculating the motor velocity comprises:
    calculating an angle value by applying an arcsine function to the sine value; and
    dividing the angle value by a time difference.

8. A control system for controlling an electric power steering system, comprising:
    an angle difference calculation module, implemented in a processor, configured to:
        receive a first set of plurality of motor position signals from a motor position sensor of the electric power steering system, each of the motor position signal from the first set indicating a position of a motor of the electric power steering system at a respective instance of time from a first duration;
        receive a second set of plurality of motor position signals from the motor position sensor, each of the motor position signal from the second set indicating a position of the motor at a respective instance of time from a second duration; and
        calculate a plurality of angle differences based on corresponding pairs of motor positions signals from the first set of motor position signals and the second set of motor position signals;
    a regression module configured to filter the plurality of angle differences by performing a linear regression analysis on the plurality of angle differences to determine a predicted angle difference, the filtering performed after calculating the plurality of angle differences between the first set of motor position signals and the second set of motor position signals;
    a motor velocity calculation module, implemented in the processor, configured to calculate a motor velocity based on the predicted angle difference; and a control module, implemented in the processor, configured to control the electric power steering system using the motor velocity.

9. The control system of claim 8, wherein each of the motor position signals comprises a first motor position signal and a second motor position signal, and each of the first and second motor position signals comprises a sine signal and a cosine signal.

10. The control system of claim 9, wherein the angle difference calculation module is configured to calculate the angle differences by using one or more trigonometric identities for the sine and cosine signals.

11. The control system of claim 9, wherein the angle difference calculation module is configured to calculate the angle differences by cross-multiplying the sine and cosine signals of the first and second motor signals.

12. The control system of claim 9, wherein the first duration is temporally ahead of the second duration.

13. The control system of claim 12, wherein the regression module is configured to calculate the angle differences by analyzing the first set of motor positions and the second set of motor positions, and the first and second durations cover a same length of time, but not a same period of time.

14. The control system of claim 8, wherein the predicted angle difference is a sine value, wherein a motor velocity calculation module is configured to calculate the motor velocity by:
calculating an angle value by applying an arcsine function to the sine value; and
dividing the angle value by a time difference.

15. A system comprising:
a power steering system that includes a motor and a motor position sensor; and
a control module, implemented in a processor, configured to:
receive a first set of plurality of motor position signals from the motor position sensor, each of the motor position signal from the first set indicating a position of a motor of the power steering system at a respective instance of time from a first duration;
receive a second set of plurality of motor position signals from the motor position sensor, each of the motor position signal from the second set indicating a position of the motor at a respective instance of time from a second duration;
calculate a plurality of angle differences based on corresponding pairs of motor positions signals from the first set of motor position signals and the second set of motor position signals;
filter the plurality of angle differences between the motor position signals by performing a linear regression analysis on the plurality of angle differences to determine a predicted angle difference, the filtering performed after calculating the plurality of angle differences between the first set of motor position signals and the second set of motor position signals;
calculate a motor velocity based on the predicted angle difference; and
control the power steering system using the motor velocity.

16. The system of claim 15, wherein the predicted angle difference is a sine value, wherein the control module is configured to calculate the motor velocity by:
calculating an angle value by applying an arcsine function to the sine value; and
dividing the angle value by a time difference.

17. The system of claim 15, wherein the motor position sensor of the power steering system comprises an analog motor position sensor.

18. The system of claim 15, wherein each of the motor position signals comprises a first motor position signal and a second motor position signal, and each of the first and second motor position signals comprises a sine signal and a cosine signal.

19. The system of claim 18, wherein the control module is configured to calculate the angle differences by cross-multiplying the sine and cosine signals of the first and second motor signals.

20. The system of claim 18, wherein the first duration is temporally ahead of the second duration.

21. The system of claim 20, wherein the control module is configured to perform the linear regression by analyzing the first set of motor positions and the second set of motor positions, and the first and second durations cover a same length of time, but not a same period of time.

* * * * *